Patented July 27, 1954

2,684,952

UNITED STATES PATENT OFFICE 2,684,952

THIOSULFENYL CHLORIDES AND BROMIDES AND POLYMERS MADE THEREFROM

Wayne A. Proell, Chicago, Ill., assignor to Standard Oil Company, Chicago, Ill., a corporation of Indiana No Drawing. Application December 22, 1950, Serial No. 202,428

16 Claims. (Cl. 260—2.3)

This invention relates to processes for the chlorination and bromination of certain organic tetrasulfides containing the linkage

—$CH_2$—$S_4$—$CH_2$— and to certain novel products produced by said processes. In a more specific aspect, this invention relates to a process for the preparation of bis-thiosulfenyl chlorides and bromides and the novel compounds thereby obtained.

One object of the present invention is to provide a process for the chlorinolysis and brominolysis of polymeric organic tetrasulfides having the —$CH_2$—$S_4$—$CH_2$— grouping. Another object is to provide a novel process for the preparation of bis-thiosulfenyl chlorides and bromides. An additional object is to provide the art with novel bis-thiosulfenyl chlorides and bromides. Still another object of the invention is to provide a process for dissolving Thiokol or Perduren-type polysulfide polymers in organic solvents and to provide processes for regenerating synthetic rubber-like materials from these solutions. Still another object is to provide a process for recovering or reclaiming synthetic tetrasulfide rubbers from scrap or waste fabricated materials containing the same. A further object of the present invention is to provide a process for the preparation of novel synthetic rubber-like latices.

Briefly, I have found that polymeric organic tetrasulfides in which one or two of the sulfur atoms in the tetrasulfide grouping is attached as side-chain sulfur (coordinate sulfur) can be converted by chlorinolysis or brominolysis to the corresponding thiosulfenyl chloride or bromide. The point of scission by chlorine or bromine in the polymeric organic tetrasulfides of the above description is definitely marked; the scission process appears to be selective and unique, leading almost entirely to the production of thiosulfenyl chlorides and bromides, rather than to the formation of random chlorinolysis and brominolysis products, as would be expected. The expected chlorinolysis and brominolysis products from polymeric organic tetrasulfides containing the grouping —$CH_2$—$S_4$—$CH_2$— would be compounds containing the CSX grouping and $S_2X_2$, wherein X is chlorine or bromine, by analogy with caustic scission of these compounds, which has been found to remove the relatively labile side-chain sulfur atoms (S. M. Martin and J. C. Patrick, Ind. Eng. Chem. 28, 1147 (October 1936)).

A preferred class of tetrasulfide compounds comprises the Thiokol or Perduren-type polymeric poly-tetrasulfide synthetic rubber-like materials (L. A. Wood, "Synthetic Rubbers—A Review of Their Compositions, Properties and Uses"—circular 427 of U. S. Dept. of Commerce, Nat. Bureau of Standards (1940)). The chlorinolysis and brominolysis of the polymeric organic tetrasulfides lead to the formation of novel bis-thiosulfenyl chlorides and bromides.

Typical polymeric rubber-like organic tetrasulfides containing as much as one-half of their sulfur content in the form of side-chain sulfur contain the following characteristic groupings:

—$(CH_2CH_2$—$S_4$—$)_n$—

—$(CH_2CH_2$—O—$CH_2CH_2$—$S_4$—$)_n$—

—$(CH_2CH_2S$—$CH_2CH_2$—$S_4$—$)_n$—

—$(\overset{CH_3}{\underset{|}{C}}HCH_2$—$S_4$—$)_n$—

—$(CH_2CH_2O$—$CH_2$—O—$CH_2CH_2$—$S_4$—$)_n$—

—$(CH_2CH$=$CH$—$CH_2$—$S_4$—$)_n$—

$n$ being an integer greater than 1.

—$(CH_2$—$\underset{\underset{OH}{|}}{C}H$—$CH_2$—$S_4$—$)_n$

—$(CH_2CH_2$—O—$CH_2CH_2$—O—$CH_2CH_2$—$S_4$—$)_n$

These materials usually have very high molecular weights and are characterized by their substantial insolubility in most organic solvents.

The polymeric rubber-like organic tetrasulfides having the structures specifically illustrated above contain as the repeating unit a plurality of Z—$CH_2$—$S_4$— groups in which at least one of the sulfur atoms is in coordinate form and in which Z represents a bivalent organic radical directly connected to the —$CH_2$— group through a carbon atom having at least one hydrogen atom attached thereto. Chlorinolysis or brominolysis of polymers containing said repeating unit yields products having the formula XSS—Z—$CH_2$—SSX, wherein Z retains the definition given above and X is chlorine or bromine.

By way of illustration, the chlorinolysis and brominolysis products obtainable from polymers having essentially the structure —$(CH_2CH_2$—$S_4$—$)_n$— commonly known as Thiokol A, have the formula X—S—S—$CH_2CH_2$—S—S—X and from

—$(CH_2CH_2$—O—$CH_2CH_2$—$S_4$—$)_n$—

(Thiokol B) have the formula

X—S—S—$CH_2CH_2$—O—$CH_2CH_2$—S—S—X wherein X is chlorine or bromine.

The general method of operation which I employ is to dissolve or disperse the polymeric organic tetrasulfide in a solvent for the chlorinolysis and brominolysis reaction products, for example a halogenated hydrocarbon solvent such as chloroform, carbon tetrachloride, 1,2-dichloroethane, perfluoroheptane; n-octane, benzene, furfural, dibutyl phthalate, tricresyl phosphate, ethyl acetate or other inert solvent. The chlorine or bromine is then introduced into the solution or mixture while effecting intimate contacting between the reactants, usually by the use of a mechanical stirring device. The chlorinolysis and brominolysis reactions are highly exothermic; consequently, heat must be removed from the reaction zone during the course of the reaction to maintain suitable reaction temperatures and to prevent runaway reactions which lead to the formation of tars and other nondescript products. Conventional cooling methods may be employed to maintain the desired reaction temperatures. A particularly desirable cooling method involves circulation of the reaction solvent (as a liquid or vapor) to a cooling zone, thence back to the reaction zone.

Suitable reaction temperatures are between about −50° C. and about 25° C., preferably about 0° C. to about 15° C. Reaction can readily be effected at or about atmospheric pressure, but elevated pressures, for example 25 to 200 p. s. i. g., can be employed, provided that the reaction temperature can be adequately controlled by maintaining a relatively low instantaneous concentration of chlorine or bromine in the reaction zone, by maintaining a high rate of circulation of the reaction solvent between cooling and reaction zones, etc.

The reaction between chlorine or bromine and the polymeric organic tetrasulfide appears to be rapid and to be limited, primarily, only by the rate of introduction of the halogen into intimate contact with the organic tetrasulfide. When solid tetrasulfides are employed, the particle size and shape are factors in the rate of reaction. Small particles having a large surface area per unit weight tend to react more rapidly than large particles having a relatively low surface area per unit weight. Suitable reaction periods, in general, vary between about 60 and about 180 minutes although it should be understood that the choice of reaction period will necessarily depend upon the prior selection of other rate-determining variables and is, in general, not critical.

Upon completion of the reaction, a solution of the organic thiosulfenyl chloride in the reaction solvent is obtained. The reaction solvent can be separated from the reaction product by low pressure distillation if desired or, preferably, the solution or a concentrate thereof is employed for various end uses, for example in further reactions to produce desired derivatives.

The present chlorinolysis and brominolysis processes can be employed for recovering and reconverting polysulfide rubbers to forms useful in industrial processing. The process comprises reaction of the contaminated or fabricated material with chlorine at about −30 to about +25° C. in the presence of a solvent, e. g., a halogenated hydrocarbon solvent such as carbon tetrachloride, followed by dispersion of the rich solution in water, preferably, in water containing a reducing agent such as $SO_2$, NaSH, $Na_2S_2O_3$, $Na_2S_2$ or the like. The resultant latex can be steamed to remove solvent, or coagulated and desolvented by conventional methods. The resultant product is a latex or rubber useful for the purposes for which the new synthetic rubber is generally used.

The present process permits recovery of Thiokol from fabricated material which has been damaged, such as oil resistant hose, etc., or from fabricated material containing fillers or fibrous solids, an permits separation of these undesirable foreign materials. It also permits reconversion of block polysulfide rubbers to latices and the addition of additives, pigments, etc. to the latex which cannot be blended into the block form.

In order more fully to illustrate the novel processes of the present invention, the following specific examples are submitted in an illustrative, and not limitative, capacity:

*Example 1*

Commercial ethylene polysulfide rubber (291 g.), known as Thiokol A and having essentially the structure $-(CH_2CH_2-S_4-)_n-$, was placed in a weighed flask and 300 cc. of carbon tetrachloride were added to just cover the rubber, which was present as slicings about 0.4 x 3 x 4 cm. in dimension. The sulfur analysis of the Thiokol A was 79.8% and it contained 1.1% of residual chlorine. A stirrer was lowered into the reactor so that it just touched the surface of the solvent. The reactor was immersed in cold water, and chlorine was passed in slowly. The stirrer was run so that a spray of solvent covered the walls of the flask, from which chilled solvent flowed back to the liquid contents in the reactor. After 2.25 hours, 148 g. of chlorine were absorbed. The solid rubber slowly disappeared and a yellow solution was produced. The temperature fell from an initial value of 17° C. to 8° C.; good cooling was necessary to effect this result, as the reaction is exothermic. The chlorine flow was discontinued and the mixture was stirred for an additional 0.5 hour, during which time a few lumps of unreacted rubber disappeared. The product was vacuum topped at pressures between 5–35 mm. of mercury and yielded 412 g. of a viscous olive green oil which was found on analysis to contain 53.2% S and 29.2% chlorine, by weight. The analysis checks quite closely with the theoretical values for $C_2H_4S_4Cl_2$, (1,2-bis(chlorothiosulfenyl)ethane), which are 56.3% S and 31.2% chlorine. The product showed $n_D^{20}$ 1.7035 and $$d_0^3\ 1.65$$

Another embodiment of the process comprises reaction of the solid rubber with chlorine in a reactor in which warm solvent (0 to 25° C.) is continuously withdrawn from the bottom or side, chilled to a low temperature, and sprayed into the top of the reactor.

*Example 2*

Thiokol A (125.5 g.) was placed in a flask with 150 cc. of chloroform. Chlorine (58.5 g.) was introduced slowly, the flask being immersed in an ice bath, and the flask contents being held at 10–15° C. All the chlorine was in after 1.3 hours. Some Thiokol was still undissolved and the mixture was stirred at 15–16° C. until all solid was gone (40 minutes). A slow stream of methanethiol gas was then introduced into the flask, with stirring, until an excess had been added. The products were removed after four hours and a portion charged to a distillation assembly. All material boiling below 60° at 0.3 mm. of mercury was topped off and discarded, at which point distillation ceased. The overhead was primarily chloroform, but some high boiling sulfur compounds (about 30 cc.) were eliminated, possibly of the disulfide type, RSSRSSR. The distillation residue of 75 g. of viscous greenish oil was found upon analysis to contain 76.7% S and 0.45% chlorine, by weight. The compound CH₃S₃C₂H₄S₃CH₃ contains 76.4% S and no chlorine. It is therefore evident that the reactions which occurred were as follows:

-(CH₂CH₂-S₄)ₙ-+nCl₂→
               nCl-S-S-CH₂CH₂-S-S-Cl

Cl-S-S-CH₂CH₂-S-S-Cl+2CH₃SH→
   CH₃-S-S-S-CH₂CH₂-S-S-S-CH₃+2HCl

*Example 3*

Thiokol-ST, which has essentially the structure:

-(CH₂CH₂-O-CH₂O-CH₂CH₂-S₄)ₙ- was stirred with 150 cc. of chloroform and chlorinated with 24.2 g. of chlorine at 13-22° C. over a period of 30 minutes. The mixture was agitated for a short time following the chlorine addition until all residual solid had dissolved. An excess of gaseous isobutene was then introduced into the liquid reaction mixture. The product was vacuum topped to a pot temperature of 135° C. at 3 mm. of mercury. Some HCl was evolved. The residual oil (90 g.) was found upon analysis to contain 29.8% S and 13% chlorine by weight. The theoretical values for (C₄H₈)₂(C₂H₄O)₂-CH₂-S₄Cl₂ are 31% S and 17.2% chlorine. While the analytical data indicate some decomposition of the product incidental to distillation, they also indicate that the following reactions occurred:

-(CH₂CH₂-O-CH₂O-CH₂CH₂-S₄)ₙ-+nCl₂→
  nCl-S-S-CH₂CH₂-O-CH₂O-CH₂CH₂-S-S-Cl

Cl-S-S-CH₂CH₂-O-CH₂O-CH₂CH₂-S-S-Cl + CH₂=C(CH₃)₂ →

$$\left( \begin{matrix} CH_3 \\ | \\ CH_3-C-CH_2-S-S-CH_2CH_2O \\ | \\ Cl \end{matrix} \right)_2 CH_2$$

*Example 4*

Thiokol A lumps (48 g.) were stirred with 191 g. of chloroform in a flask immersed in an ice bath. Bromine (49 g.) was introduced into the flask over a period of 35 minutes while the internal temperature therein was maintained at 10-17° C. The mixture was agitated and allowed to react for 30 minutes following bromine addition, at which time all the synthetic rubber had dissolved. The flask was then maintained at 10-15° C. and an excess of gaseous isobutene was bubbled into the liquid reaction mixture. The reaction products were distilled and all material boiling below 61° C. at 0.5 mm. of mercury was removed. A distillate (14 cc.) with a boiling point above chloroform was recovered. Considerable HBr was evolved in the vacuum distillation process. The distillate analyzed 29.4% S and 31.8% bromine and is therefore an ethane bis-thiosulfenyl bromide-isobutene adduct (30% S, 32.4% Br). The brominated adduct with isobutene is less stable than the chlorinated adduct.

*Example 5*

Thiokol A (73.5 g.) was stirred with 200 cc. of chloroform and chlorinated with 33.5 g. of chlorine at 9-12° C. Butadiene was passed slowly into the resultant solution until 24.5 g. were absorbed. The mixture was allowed to react at 12-19° C. for a total time of 2.3 hours, including 0.66 hour after all the butadiene had been introduced. Then a large excess of butadiene was added to react with and remove any unreacted halide. About 15 g. of a soft chloroform- and oil-insoluble, tacky resin separated out during the reaction with butadiene. The chloroform solution was separated and then evaporated and vacuum topped under the pressure of 1 mm. of mercury at 40° C. to produce, as a residue, a very tacky, soft resin which was not miscible with the chloroform-insoluble resin. The volume of chloroform-soluble resin was 50 cc. and it was found upon analysis to contain 41.8% S and 27.3% chlorine, by weight. The theoretical values for a mono-butadiene adduct of 1,2-bis(chlorothiosulfenyl)ethane are 45.5% S and 25.4% Cl. The chloroform-insoluble resin was reacted with hot water to produce a yellow, tacky resin which appears to be a hydrolyzate. The chloroform-insoluble resin is quite insoluble in oils and water and can be used as a softener or plasticizer for sulfur, imparting toughness and elasticity to the sulfur when employed in amounts of 10-20% by weight.

*Example 6*

Large pieces of Thiokol A (213 g.) were placed in 100 cc. of carbon tetrachloride and slowly chlorinated over a period of 3 hours at 10-22° C. All the Thiokol dissolved after 101 g. of chlorine had been introduced. The carbon tetrachloride solvent was removed by distillation at 19-35 mm. of mercury pressure, keeping the pot temperature between 2 and 8° C. The reaction product was 303 g. of an olive green oil, 1,2-bis(chlorothiosulfenyl)ethane. The reaction product was stirred into water and after a few minutes yielded a sticky rubber. If the water contains a reducing agent, the sulfenyl groups in the reaction product are converted to polysulfides and the original Thiokol rubber is regenerated. If desired, a dispersing agent, such as magnesium hydroxide, can be used to form a latex from the treated rubber.

In the above examples I have, among other things, described the reaction of isobutylene and butadiene, respectively, with 1,2-bis(chlorothiosulfenyl)ethane. It will be apparent that the reactions of organic bis-thiosulfenyl chlorides and bromides can be conducted with other mono- and polyolefinic materials, for example styrene or divinylbenzene. Moreover, the thiosulfenyl halide products produced by the present invention can be reacted with mono- or poly-mercaptides. Numerous other derivatives will, no doubt, suggest themselves to those skilled in the art.

Having thus described my invention, what I claim is:

1. A process for the preparation of a bis-thiosulfenyl halide, which process comprises contacting a halogen selected from the class consisting of chlorine and bromine in quantity sufficient to effect substantial production of a bis-thiosulfenyl halide under anhydrous conditions with a polymeric organic tetrasulfide having as the repeating unit —Z—CH₂—S₄— groups in which at least one of the sulfur atoms is in coordinate form in the molecule and Z is a bivalent organic radical selected from the group consisting of aliphatic hydrocarbons, oxyaliphatic hydrocarbons, hydroxyaliphatic hydrocarbons, and thioaliphatic hydrocarbons, Z is directly attached to the —CH₂— group through a carbon atom having at least one hydrogen atom attached thereto, and effecting said contacting at a temperature between about —50° C. and about 25° C. in the presence of an inert solvent to produce a compound having the formula XSS—Z—CH₂—SSX, wherein Z is said bivalent organic radical and X is selected from the class consisting of chlorine and bromine.

2. The process of claim 1 wherein said inert solvent is a halogenated hydrocarbon.

3. The process of claim 1 wherein Z is a —CH₂— radical, said halogen is chlorine, and said inert solvent is a low boiling halogenated hydrocarbon.

4. The process of claim 1 wherein Z is a —CH₂— radical, said halogen is a bromine, and said inert solvent is a low boiling halogenated hydrocarbon.

5. The process of claim 1 which comprises the additional step of treating the reaction products, comprising a compound having the formula XSS—Z—CH₂—SSX, wherein Z is the bivalent organic radical defined in claim 1, with water to produce a synthetic rubber.

6. A process for the preparation of a bis-thiosulfenyl chloride, which process comprises contacting chlorine in quantity sufficient to effect substantial production of a bis-thiosulfenyl chloride under anhydrous conditions with a polymeric organic tetrasulfide having as the repeating unit —Z—CH₂—S₄— groups in which at least one of the sulfur atoms is in coordinate form in the molecule and Z is a bivalent aliphatic hydrocarbon radical which is directly attached to the —CH₂— group through a carbon atom having at least one hydrogen atom attached thereto, and effecting said contacting at a temperature between about —50° C. and about 25° C. in the presence of an inert solvent to produce a compound having the formula ClSS—Z—CH₂—SSCl, wherein Z is said bivalent aliphatic hydrocarbon radical.

7. A process for the preparation of a bis-thiosulfenyl chloride, which process comprises contacting chlorine in quantity sufficient to effect substantial production of a bis-thiosulfenyl chloride under anhydrous conditions with a polymeric organic tetrasulfide having as the repeating unit —Z—CH₂—S₄— groups in which at least one of the sulfur atoms is in coordinate form in the molecule and Z is a bivalent oxyaliphatic hydrocarbon radical which is directly attached to the —CH₂— group through a carbon atom having at least one hydrogen atom attached thereto, and effecting said contacting at a temperature between about —50° C. and about 25° C. in the presence of an inert solvent to produce a compound having the formula ClSS—Z—CH₂—SSCl wherein Z is said bivalent oxyaliphatic hydrocarbon radical.

8. A process for the preparation of a bis-thiosulfenyl chloride, which process comprises contacting chlorine in quantity sufficient to effect substantial production of a bis-thiosulfenyl chloride under anhydrous conditions with a polymeric organic tetrasulfide having as the repeating unit —Z—CH₂—S₄— groups in which at least one of the sulfur atoms is in coordinate form in the molecule and Z is a bivalent thioaliphatic hydrocarbon radical which is directly attached to the —CH₂— group through a carbon atom having at least one hydrogen atom attached thereto, and effecting said contacting at a temperature between about —50° C. and about 25° C. in the presence of an inert solvent to produce a compound having the formula ClSS—Z—CH₂—SSCl, wherein Z is said bivalent thioaliphatic hydrocarbon radical.

9. New compounds having the general formula XSS—Z—CH₂—SSX, in which formula Z represents a bivalent organic radical selected from the group consisting of aliphatic hydrocarbons, oxyaliphatic hydrocarbons, hydroxyaliphatic hydrocarbons, and thioaliphatic hydrocarbons, Z is directly attached to the —CH₂— group in said formula by a carbon atom having at least one hydrogen atom attached thereto, and X is selected from the class consisting of chlorine and bromine.

10. As new compounds, 1,2-bis(halogen thiosulfenyl-)ethanes having the formula

X—S—S—CH₂CH₂—S—S—X wherein X is selected from the class consisting of chlorine and bromine.

11. As a new compound, 1,2-bis(chlorothiosulfenyl)ethane, having the formula

Cl—S—S—CH₂CH₂—S—S—Cl

12. As a new compound, 1,2-bis(bromothiosulfenyl)ethane, having the formula

Br—S—S—CH₂CH₂—S—S—Br

13. A new compound having the formula

Cl—S—S—CH₂CH₂—O—
                          CH₂O—CH₂CH₂—S—S—Cl

14. New compounds having the general formula ClSS—Z—CH₂—SSCl, in which formula Z represents a bivalent aliphatic hydrocarbon radical and Z is directly attached to the —CH₂— group in said formula by a carbon atom having at least one hydrogen atom attached thereto.

15. New compounds having the general formula ClSS—Z—CH₂—SSCl, in which formula Z represents a bivalent oxyaliphatic hydrocarbon radical and Z is directly attached to the —CH₂— group in said formula by a carbon atom having at least one hydrogen atom attached thereto.

16. New compounds having the general formula ClSS—Z—CH₂—SSCl, in which formula Z represents a bivalent thioaliphatic hydrocarbon radical and Z is directly attached to the —CH₂— group in said formula by a carbon atom having at least one hydrogen atom attached thereto.

References Cited in the file of this patent

UNITED STATES PATENTS

| Number | Name | Date |
|---|---|---|
| 2,466,963 | Patrick | Apr. 12, 1949 |

FOREIGN PATENTS

| Number | Country | Date |
|---|---|---|
| 412,349 | Great Britain | June 28, 1934 |